US012461204B2

(12) United States Patent
Robertson, Jr. et al.

(10) Patent No.: US 12,461,204 B2
(45) Date of Patent: Nov. 4, 2025

(54) SENSOR ASSEMBLY

(71) Applicant: Ford Global Technologies, LLC, Dearborn, MI (US)

(72) Inventors: Michael Robertson, Jr., Garden City, MI (US); Venkatesh Krishnan, Canton, MI (US); Rashaun Phinisee, Ypsilanti, MI (US); Kunal Chaudhari, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1051 days.

(21) Appl. No.: 17/505,687

(22) Filed: Oct. 20, 2021

(65) Prior Publication Data

US 2023/0124645 A1 Apr. 20, 2023

(51) Int. Cl.
| | |
|---|---|
| G01S 7/481 | (2006.01) |
| B60S 1/56 | (2006.01) |
| G01D 11/26 | (2006.01) |
| G01S 17/931 | (2020.01) |
| G01S 17/86 | (2020.01) |

(52) U.S. Cl.
CPC .............. *G01S 7/4813* (2013.01); *B60S 1/56* (2013.01); *G01D 11/26* (2013.01); *G01S 17/931* (2020.01); *G01S 17/86* (2020.01)

(58) Field of Classification Search
CPC ........... G01S 2007/4977; G01S 7/4043; G01S 17/931; G01S 3/789; B60H 2001/003; B60S 1/56

See application file for complete search history.

(56) References Cited

U.S. PATENT DOCUMENTS

| | | | | |
|---|---|---|---|---|
| 10,761,190 | B1* | 9/2020 | Sykula | G01S 17/931 |
| 2010/0020306 | A1* | 1/2010 | Hall | H01S 5/0428 |
| | | | | 356/5.01 |
| 2018/0067210 | A1* | 3/2018 | Matsuyama | G01S 17/42 |
| 2018/0149742 | A1* | 5/2018 | Izadian | H01Q 1/428 |
| 2020/0101905 | A1* | 4/2020 | Taylor | B60R 9/04 |
| 2020/0247329 | A1* | 8/2020 | Robertson, Jr. | B60R 11/00 |
| 2021/0025982 | A1 | 1/2021 | Robertson, Jr. et al. | |

FOREIGN PATENT DOCUMENTS

| | | | |
|---|---|---|---|
| CN | 2079230 U | * | 6/1991 |
| WO | 2021021516 A1 | | 2/2021 |

* cited by examiner

*Primary Examiner* — Edelmira Bosques
*Assistant Examiner* — Michael James Giordano
(74) *Attorney, Agent, or Firm* — Frank A. MacKenzie; Brooks Kushman P.C.

(57) ABSTRACT

A sensor assembly includes a housing defining a chamber. A sensor unit is supported by the housing and extends vertically upward along an axis from the housing. The sensor unit includes a base and a sensor housing mounted to the base and rotatable relative to the base about the axis. The sensor unit includes a sensor. The sensor housing extends circumferentially around the sensor and defines a sensor chamber therebetween. A blower box is supported by the housing in the chamber. The blower box defines a blower chamber in fluid communication with the sensor chamber. A blower is disposed in the blower box.

19 Claims, 8 Drawing Sheets

SENSOR ASSEMBLY

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
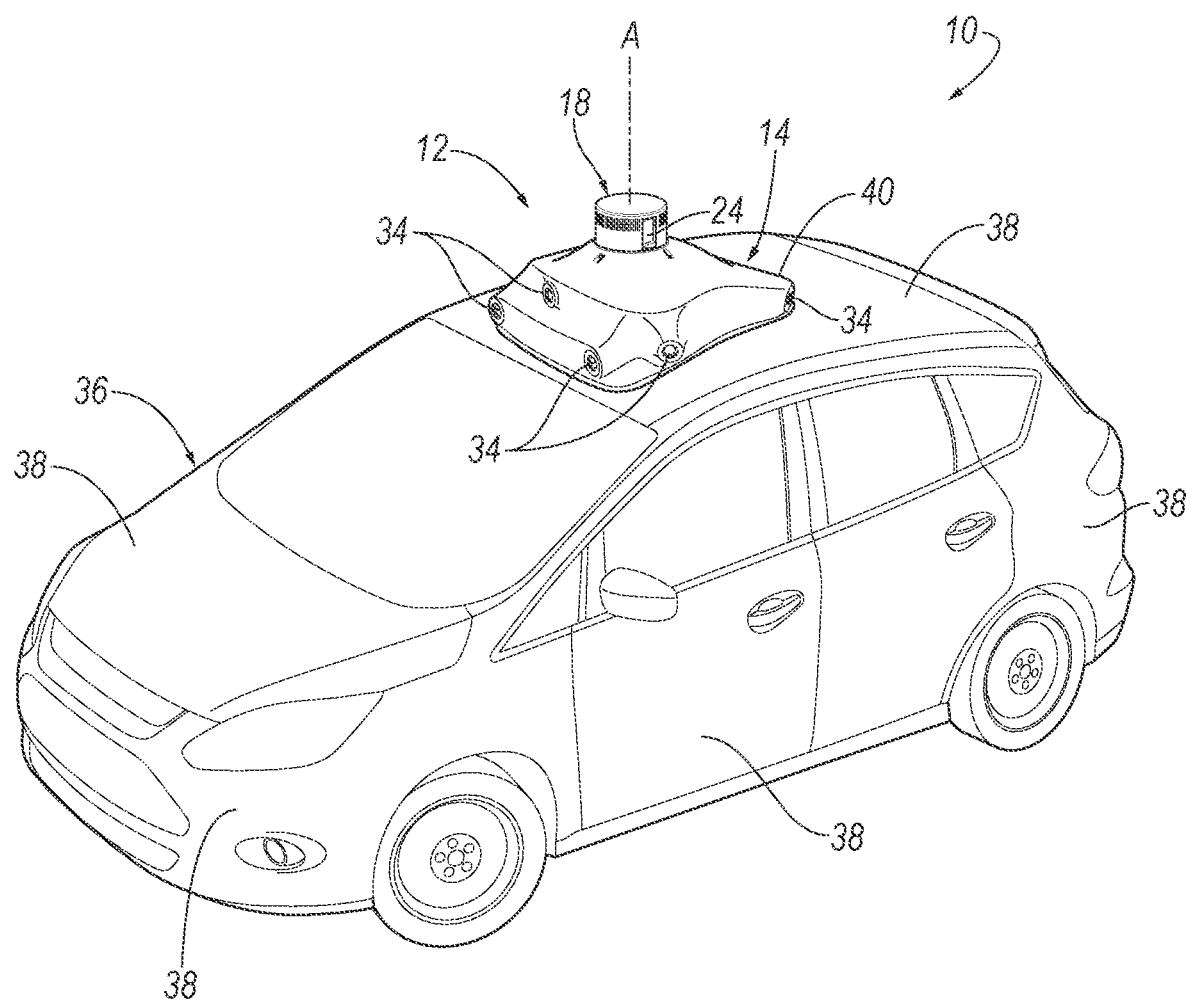
FIG. 1 is a perspective view of a vehicle including an example sensor assembly mounted to a roof.

A sensor assembly includes a housing defining a chamber. A sensor unit is supported by the housing and extends vertically upward along an axis from the housing. The sensor unit includes a base and a sensor housing mounted to the base and rotatable relative to the base about the axis. The sensor unit includes a sensor. The sensor housing extends circumferentially around the sensor and defines a sensor chamber therebetween. A blower box is supported by the housing in the chamber. The blower box defines a blower chamber in fluid communication with the sensor chamber. A blower is disposed in the blower box.

The sensor assembly may include a bracket supported by the blower box in the chamber and extending partially circumferentially about the axis. The bracket may include a top and a bottom spaced from each other along the axis. The bottom may be sealed to the blower box and the top may be adjacent the sensor housing. The bottom of the bracket may be sealed to the base.

The bracket may include a first gutter at the top. The first gutter may include an inner wall disposed radially inward from the sensor housing and an outer wall disposed radially outward from the sensor housing. The first gutter may include a floor extending from the inner wall to the outer wall. The sensor housing may be spaced from the floor of the first gutter along the axis.

The bracket may define a channel extending from the blower chamber to the sensor chamber. The blower may be in fluid communication with the sensor via the channel.

The bracket may be a first bracket. The sensor assembly may include a second bracket supported by the housing in the chamber and extending partially circumferentially about the axis from the first bracket to the first bracket. The second bracket may include an upper portion and a lower portion spaced from each other along the axis. The lower portion may be connected to the housing and the upper portion may be adjacent the sensor housing. The lower portion of the second bracket may be sealed to the base.

The second bracket may include a second gutter at the upper portion. The second gutter may include an inner side disposed radially inward from the sensor housing. The second gutter may include a bottom side extending radially outward from the inner side. The sensor housing may be spaced from the bottom side of the second gutter along the axis.

The sensor assembly may include a fluid nozzle supported by the second bracket. The fluid nozzle may be aimed to direct fluid across the sensor.

The sensor assembly may include a motor arranged to rotate the sensor housing relative to the base.

The blower box may include an inlet extending circumferentially about a blower axis. The blower may be in fluid communication with the chamber via the inlet.

The blower may include an intake concentric with the inlet relative to the blower axis.

The blower may be sealed to the blower box entirely around the inlet.

The housing may include a housing upper piece having a plurality of drain holes spaced from each other circumferentially about the axis.

The blower box may include an outlet in fluid communication with the sensor chamber and a drain spaced from the outlet. The blower box may be sealed except for the outlet and the drain.

The blower may be fixed to the blower box. The housing includes a housing upper piece and a housing lower piece. The blower may be spaced from the housing upper piece and the housing lower piece in the chamber.

With reference to the Figures, wherein like numerals indicate like parts throughout the several views, a sensor assembly 12 for a vehicle 10 includes a housing 14 defining a chamber 16. A sensor unit 18 is supported by the housing 14 and extends vertically upward along an axis A from the housing 14. The sensor unit 18 includes a base 20 and a sensor housing 22 mounted to the base 20 and rotatable relative to the base 20 about the axis A. The sensor unit 18 includes a sensor 24. The sensor housing 22 extends circumferentially around the sensor 24 and defines a sensor chamber 26 therebetween. A blower box 28 is supported by the housing 14 in the chamber 16. The blower box 28 defines a blower chamber 30 in fluid communication with the sensor chamber 26. A blower 32 is disposed in the blower box 28.

The sensor assembly 12 uses air for cleaning and/or drying the sensor 24, e.g., by pushing debris and/or liquid droplets off the sensor 24, as well as for cooling the sensor 24. The blower 32 may be disposed in the chamber 16 and configured to direct airflow from the chamber 16 towards the sensor 24. However, since the sensor unit 18 rotates at a high rate of speed relative to the base 20, a gap is present between the sensor housing 22 and the housing 14, which can allow air to leak out of the chamber 16 and thereby reduces the velocity of the air being directed towards the sensor 24. Advantageously, the blower 32 exhausts air into the blower chamber 30, which directs the air into the sensor chamber 26. Directing the air from the blower 32 into the sensor chamber 26 via the blower box 28 concentrates the air flow towards the sensor 24 and reduces air leakage from the chamber 16, which allows the air to exhaust into the sensor chamber 26 at a velocity sufficient to clean and/or dry the sensor 24 and to cool the sensor 24.

With reference to FIG. 1, the vehicle 10 may be any passenger or commercial automobile such as a car, a truck, a sport utility vehicle, a crossover, a van, a minivan, a taxi, a bus, etc.

The vehicle 10 may be an autonomous vehicle. A vehicle computer can be programmed to operate the vehicle 10 independently of the intervention of a human driver, completely or to a lesser degree. The vehicle computer may be programmed to operate a propulsion, brake system, steering, and/or other vehicle systems based at least in part on data received from the sensor 24 described below, as well as other sensors 34. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 10 includes a body 36. The vehicle 10 may be of a unibody construction, in which a frame and the body 36 of the vehicle are a single component. The vehicle 10 may, alternatively, be of a body-on-frame construction, in which the frame supports the body 36 that is a separate component from the frame. The frame and body 36 may be formed of any suitable material, for example, steel, aluminum, etc.

The body 36 includes body panels 38 partially defining an exterior of the vehicle 10. The body panels 38 may present a class-A surface, e.g., a finished surface exposed to view by a customer and free of unaesthetic blemishes and defects. The body panels 38 include, e.g., a roof, etc.

The housing 14 is attachable to the vehicle 10, e.g., to one of the body panels 38 of the vehicle 10, e.g., the roof. For example, the housing 14 may be shaped to be attachable to the roof, e.g., may have a shape matching a contour of the roof. The housing 14 may be attached to the roof, which can provide the sensor 24 and the other sensors 34 with an unobstructed field of view of an area around the vehicle 10. The housing 14 may be formed of, e.g., plastic or metal.

Figure 2:
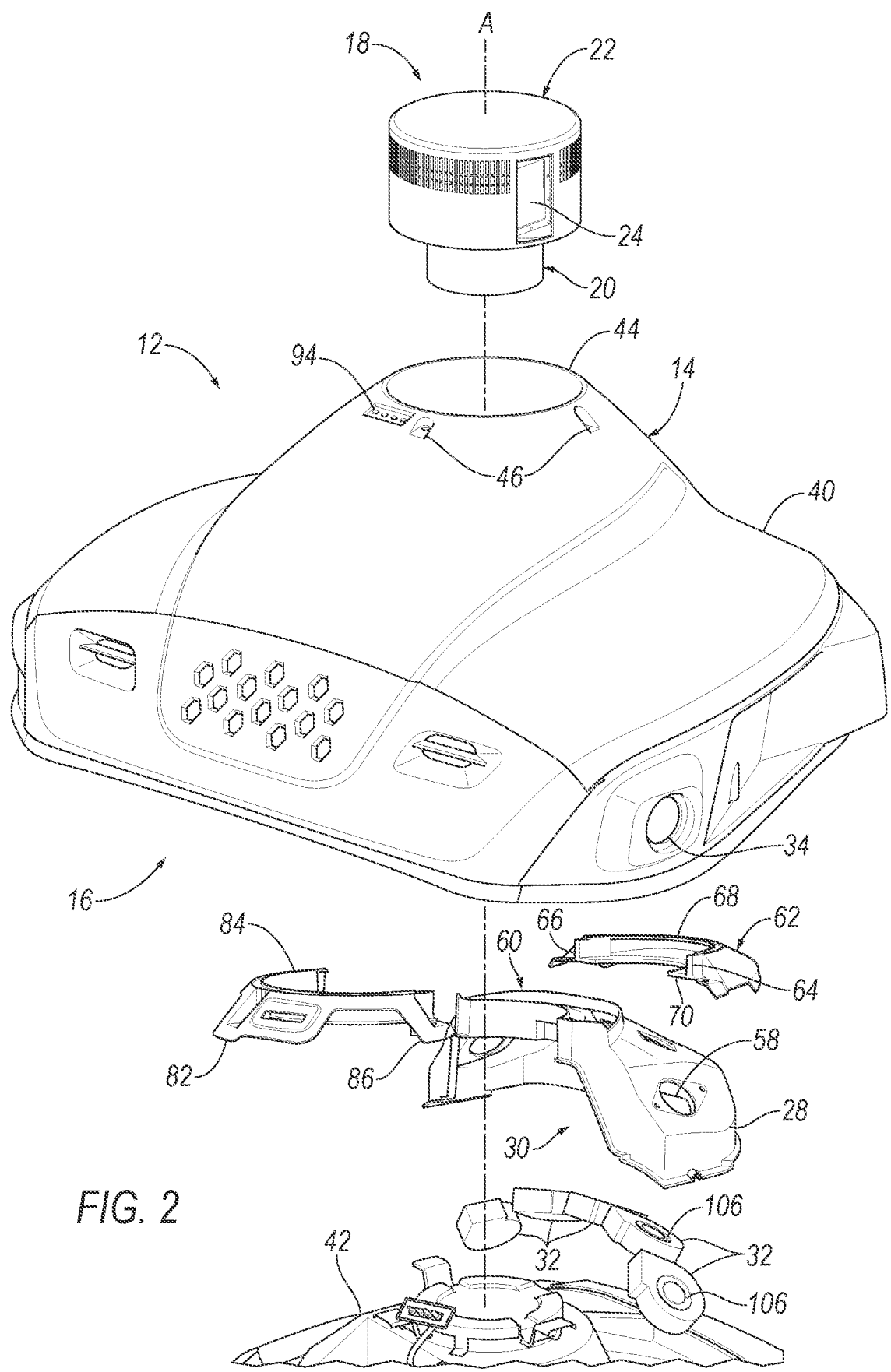
FIG. 2 is an exploded view of the sensor assembly including a housing lower piece and a housing upper piece.

With reference to FIG. 2, the housing 14 includes a housing upper piece 40 and a housing lower piece 42. The housing upper piece 40 and the housing lower piece 42 are shaped to fit together, with the housing upper piece 40 fitting on top of the housing lower piece 42. The housing upper piece 40 covers the housing lower piece 42. The housing 14 may enclose and define the chamber 16; for example, the housing upper piece 40 and the housing lower piece 42 may enclose and define the chamber 16. The housing 14 may shield contents of the chamber 16 from external elements such as wind, rain, debris, etc.

The housing upper piece 40 includes a central opening 44 that exposes the housing lower piece 42. The central opening 44 is round, e.g., has a circular or slightly elliptical shape. The central opening 44 may be centered on the axis A.

The housing upper piece 40 may include a plurality of drain holes 46 extending through the housing upper piece 40. The drain holes 46 may be spaced from each other circumferentially about the axis A. The drain holes 46 are disposed above other components in the chamber 16, e.g., other sensors 34, the blower 32, etc., relative to the axis A.

The drain holes 46 can drain water received, e.g., from the gap between the sensor housing 22 and the housing 14. By being disposed above other components in the housing 14, the drain holes 46 direct water out of the chamber 16 prior to the water reaching the other components contained within the chamber 16.

The housing upper piece 40 and the housing lower piece 42 are each monolithic. For the purposes of this disclosure, "monolithic" means a single-piece unit, i.e., a continuous piece of material without any fasteners, joints, welding, adhesives, etc., fixing multiple pieces to each other. For example, the housing upper piece 40 and the housing lower piece 42 may each be stamped or molded as a single piece.

Figure 3:
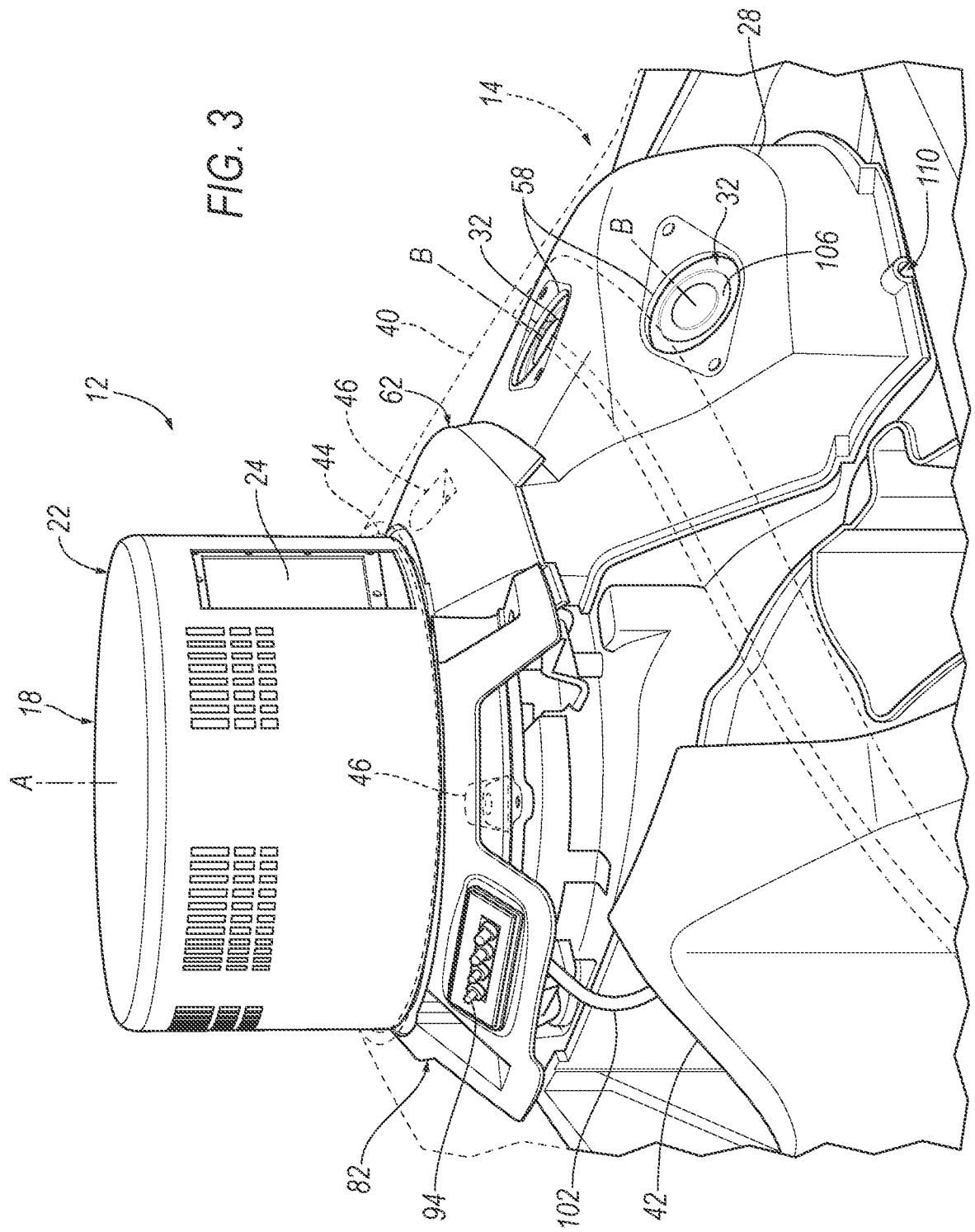
FIG. 3 is a perspective view of the sensor assembly including a blower box covered by the housing upper piece.

With reference to FIG. 3, the sensor unit 18 is supported by and mounted to the housing 14, specifically the housing lower piece 42. For example, the base 20 may be fixed to the housing lower piece 42, e.g., via fasteners, welding, adhesive, etc. The sensor unit 18 can be disposed on top of the housing 14 at a highest point of the housing 14. For example, the sensor unit 18 can extend through a central opening 44 of the housing upper piece 40.

Figure 4:
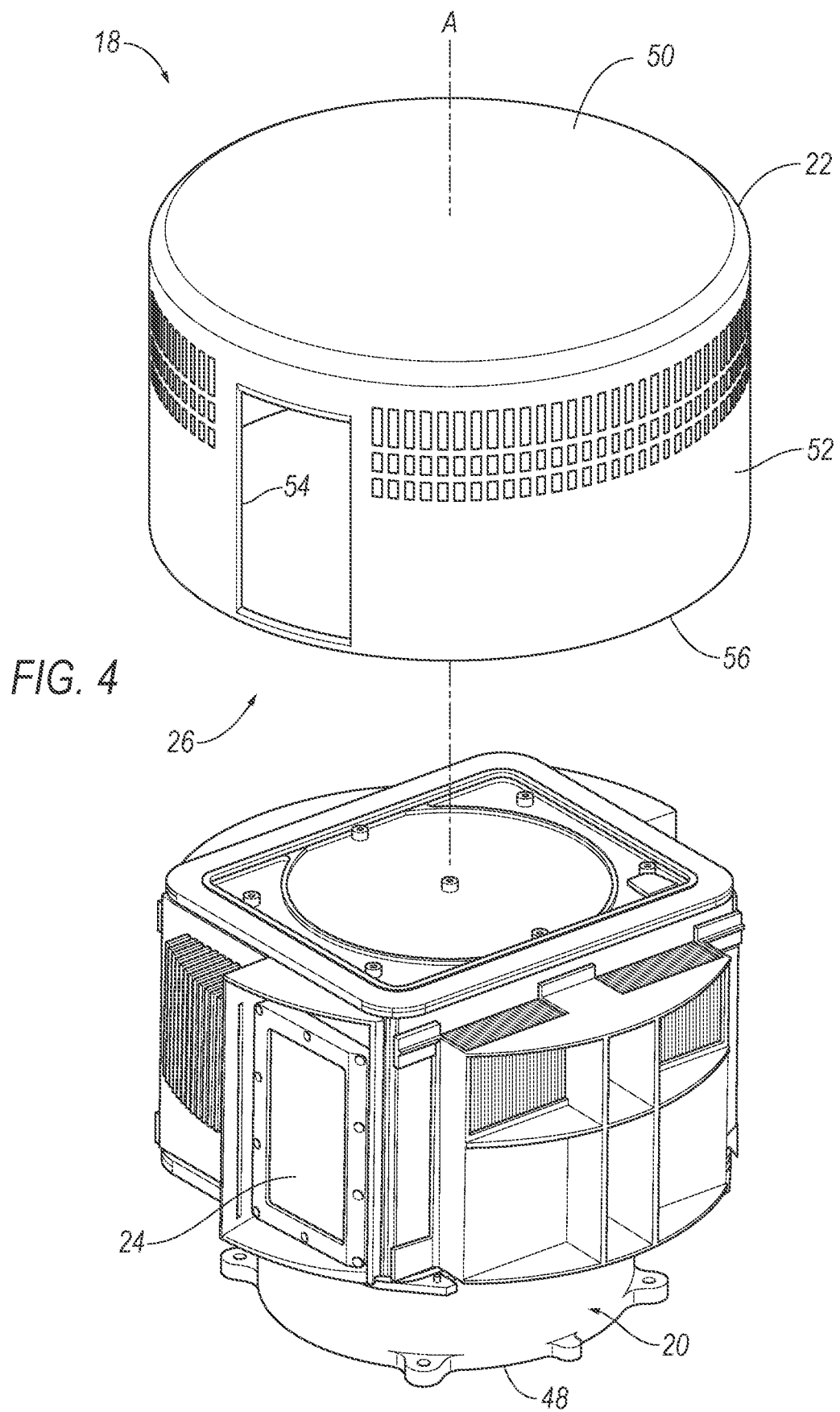
FIG. 4 is an exploded view of an example sensor unit.

With reference to FIG. 4, the sensor unit 18 includes a motor 48, the sensor 24, and the sensor housing 22. The motor 48 is attached to and fixed relative to the housing lower piece 42. The motor 48 can be any suitable type for rotating the sensor 24, e.g., an electric motor. For example, the motor 48 can include a stator (not shown) fixed relative to the housing lower piece 42 and a rotor (not shown) rotatable by the stator around the axis A and fixed relative to the sensor 24. The sensor 24 is rotatably drivably coupled to the motor 48.

The sensor housing 22 is fixed relative to the sensor 24 and thereby drivably coupled to the motor 48. That is, the sensor housing 22 is rotatable relative to the base 20 about the axis A. For example, the sensor housing 22 may be attached to the sensor 24, e.g., via fasteners, adhesives, etc. The sensor 24 is disposed inside the sensor housing 22. Specifically, the sensor housing 22 extends circumferentially about, i.e., covers, the sensor 24.

The sensor housing 22 includes a top 50 and wall 52 having openings 54 and a bottom edge 56. The top 50 is flat and has a circular shape. The top 50 may be attached to the sensor 24. The top 50 extends circumferentially about the axis A along the wall 52, and the top 50 extends radially outward from the axis A to the wall 52.

The wall 52 has a cylindrical shape and defines the axis A. The wall 52 has a constant circular cross-section extending upward along the axis A from the bottom edge 56 to the top 50. The wall 52 is open at the bottom edge 56, thereby permitting airflow into the sensor chamber 26.

The openings 54 are rectangular and are oriented substantially vertically. That is, the openings 54 are elongated along the axis A. The openings 54 are recessed radially inward from the wall 52 in window wells. The openings 54 are spaced from each other about the axis A. That is, the openings 54 are spaced from each other circumferentially around the sensor housing 22.

The sensor chamber 26 extends along the axis A from the top 50 to the bottom edge 56 of the wall 52. Additionally, the sensor chamber 26 extends annularly about the axis A. Specifically, the sensor chamber 26 extends radially outward from the sensor 24 to the wall 52. The sensor chamber 26 may be external to the chamber 16. For example, the blower 32 may direct air from the chamber 16 to the sensor chamber 26 via the central opening 44.

The sensor 24 may be designed to detect features of the outside world; for example, the sensor 24 may be a radar sensor, a scanning laser range finder, a light detection and ranging (LIDAR) device, or an image processing sensor such as a camera. In particular, the sensor 24 may be a LIDAR device, e.g., a scanning LIDAR device. A LIDAR device detects distances to objects by emitting laser pulses at a particular wavelength and measuring the time of flight for the pulse to travel to the object and back. The operation of the sensor unit 18 is performed by the sensor 24, e.g., a LIDAR sensor 24, having at least one sensor window. For example, the sensor unit 18 can include two sensor windows. The sensor 24 has fields of view through the openings 54 encompassing a region from which the sensor unit 18 receives input. As the sensor 24 rotates, the fields of view encompass a horizontal 360° around the vehicle 10.

Figure 5A:
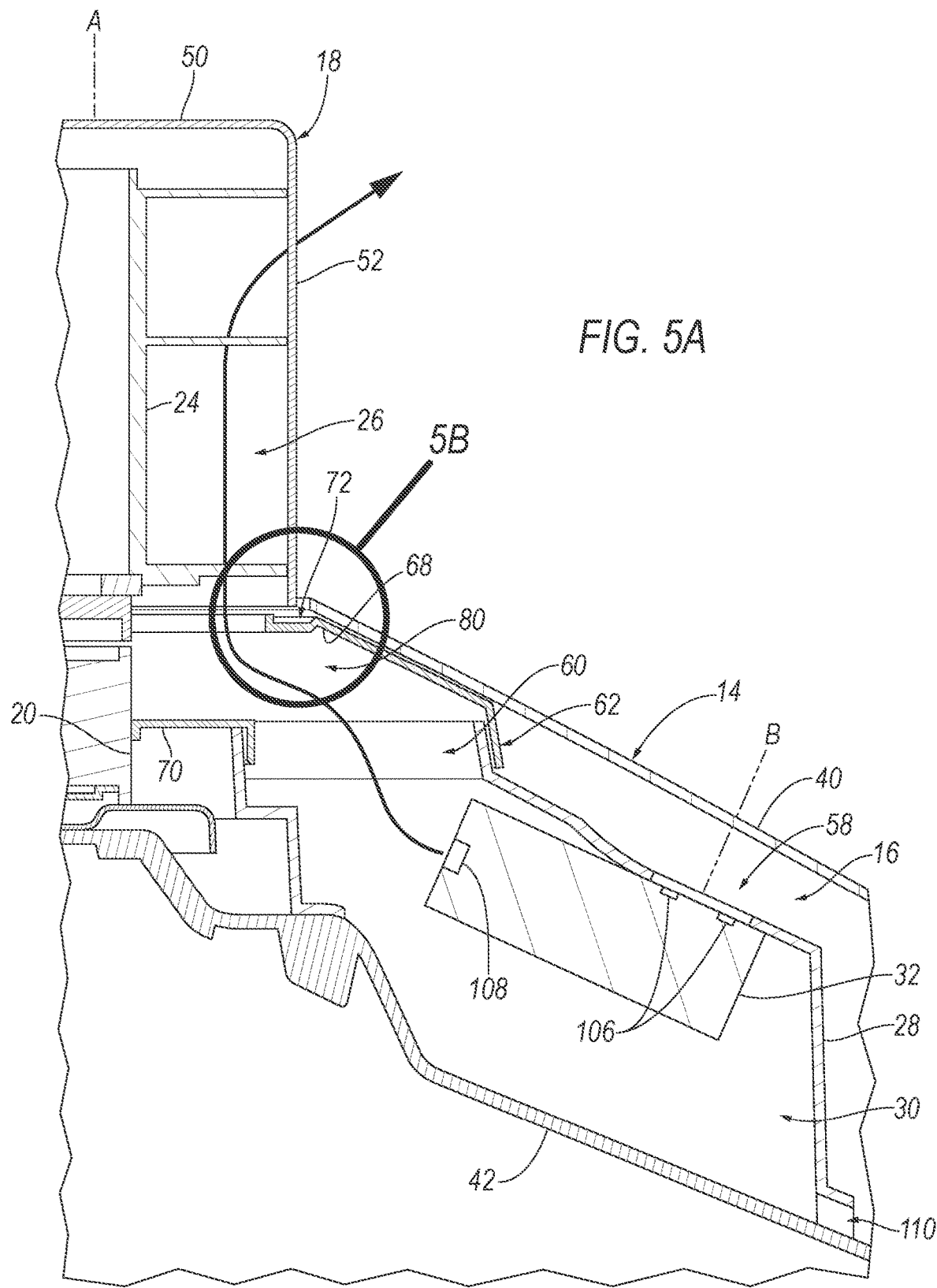
FIG. 5A is a cross-sectional view of a portion of the sensor assembly.

With reference to FIG. 5A, the blower 32 is disposed in the blower chamber 30. The blower 32 is supported by the housing lower piece 42. For example, the blower 32 may be mounted to the blower box 28, which may be attached to the housing lower piece 42. In this situation, the blower 32 may be spaced from the housing lower piece 42 and the housing upper piece 40 in the chamber 16. For example, the blower 32 may include locating elements, fasteners, etc., that engage the blower box 28. Additionally, or alternatively, fasteners may engage the blower 32 and the blower box 28 to mount the blower 32 to the blower box 28. Alternatively, the blower 32 may be mounted to the housing lower piece 42, e.g., in substantially the same manner as just discussed. The sensor assembly 12 may include any suitable number of blowers 32, e.g., five blowers 32 as shown in FIG. 2.

The blower 32 may include an electric motor, a fan, or other suitable structure for moving air. The blower 32 moves air between an intake 106 and an exhaust 108. The blower 32 may be configured to draw air via the intake 106 and exhaust air via the exhaust 108. The intake 106 of the blower 32 is in fluid communication with the chamber 16, and the exhaust 108 of the blower 32 is in fluid communication with the blower chamber 30. That is, the blower 32 pulls air from the chamber 16 and urges air to flow out of the exhaust 108 through the blower chamber 30 and towards the sensor 24.

With continued reference to FIG. 5A, the blower box 28 is disposed in the chamber 16. The blower box 28 may be supported by the housing lower piece 42. For example, the blower box 28 may be mounted to the housing lower piece 42. For example, the blower box 28 may include locating elements, fasteners, etc., that engage the housing lower piece 42. Additionally, or alternatively, fasteners may engage the blower box 28 and the housing lower piece 42 to mount the blower box 28 to the housing lower piece 42. The blower box 28 may be formed of, e.g., plastic or metal.

The blower box 28 defines the blower chamber 30, as set forth above. For example, the blower box 28 and the housing lower piece 42 may enclose and define the blower chamber 30. The blower chamber 30 may shield contents of the blower chamber 30 from external elements such as wind, rain, debris, etc., e.g., that may enter the chamber 16 via the central opening 44, an air inlet, etc.

With continued reference to FIG. 5A, the blower box 28 includes an outlet 60 and an inlet 58 spaced from the outlet 60. The blower 32, e.g., the intake 106, may be in fluid communication with the chamber 16 through the inlet 58 of the blower box 28. The inlet 58 may extend circumferentially about a blower axis B, as shown in FIGS. 2-3. For example, the inlet 58 may extend entirely around the intake 106 of the blower 32 relative to the blower axis B, as shown in FIG. 3. The inlet 58 may be concentric with the intake 106 of the blower relative to the blower axis B. The blower box 28 may include any suitable number of inlets 58. For example, the blower box 28 may include inlets 58 for respective blowers 32, i.e., a same number of inlets 58 as blowers 32.

The outlet 60 of the blower box 28 is in fluid communication with the sensor chamber 26. That is, the outlet 60 of the blower box 28 is configured to direct air from the blower chamber 30 to the sensor chamber 26. The outlet 60 may extend partially circumferentially about the axis A, as shown in FIG. 2. The outlet 60 of the blower box 28 may be disposed below the sensor chamber 26 relative to the axis A. The outlet 60 may face the sensor chamber 26. In other words, the outlet 60 may extend in a plane transverse to the axis A. The outlet 60 may be disposed at a highest point on the blower box 28.

With continued reference to FIG. 5A, the blower box 28 may include a drain 110 spaced from the outlet 60. The drain 110 may extend through the blower box 28. In other words, the chamber 16 may be in fluid communication with the blower chamber 30 through the drain 110. The drain 110 may be defined by the blower box 28 and the housing lower piece 42. For example, the drain 110 may be defined by a portion of an edge of the blower box 28 that is spaced from the housing lower piece 42. The edge of the blower box 28 may abut the housing lower piece 42 except for at the drain 110, as shown in FIG. 3. The drain 110 may be disposed at a lowest point on the blower box 28 to allow water to exit the blower chamber 30.

The blower box 28 may be sealed except for the outlet 60 and the drain 110, e.g., to prevent air leakage from the blower chamber 30 to the chamber 16. For example, the blower box 28 may be sealed to the housing lower piece 42. That is, air may be permitted to exit the blower chamber 30 via the outlet 60 and water may be permitted to exit the blower chamber 30 via the drain 110. Additionally, the blower 32 may be sealed to the blower box 28 entirely around the inlet 58. In other words, air may be permitted to enter the blower chamber 30 via the exhaust 108 from the blower 32.

With continued reference to FIG. 5A, the sensor assembly 12 may include a first bracket 62 supported by the blower box 28 in the chamber 16. For example, the first bracket 62 may be mounted to the blower box 28. For example, the first bracket 62 may include locating elements, fasteners, etc., that engage the blower box 28. Additionally, or alternatively, fasteners may engage the first bracket 62 and the blower box 28 to mount the first bracket 62 to the blower box 28. Additionally, or alternatively, the first bracket 62 may be mounted to the housing upper piece 40. Alternatively, the first bracket 62 and the blower box 28 may be monolithic.

The first bracket 62 may extend partially circumferentially about the axis A. For example, the first bracket 62 may include two sides 64, 66 spaced from each other circumferentially about the axis A, as shown in FIG. 2. The first bracket includes a top 68 and a bottom 70 spaced from each other along the axis A. The top 68 and the bottom 70 extend from one side 64 to the other side 66 of the first bracket 62.

With continued reference to FIG. 5A, the bottom 70 may extend radially inward of the top 68 relative to the axis A. The bottom 70 of the first bracket 62 may be connected to the outlet 60 of the blower box 28. The bottom 70 of the first bracket 62 may, for example, be sealed to the blower box 28, e.g., entirely around the outlet 60. The bottom 70 of the first bracket 62 may abut the base 20 from one side 64 to the other side 66. That is, the bottom 70 of the first bracket 62 may extend radially outward from the base 20 to the blower box 28 relative to the axis A. The bottom 70 may be sealed to the base 20 from one side 64 to the other side 66.

With continued reference to FIG. 5A, the top 68 of the first bracket 62 may be disposed adjacent to the sensor housing 22, e.g., the bottom edge 56. That is, the first bracket 62 may extend along the axis A from the blower box 28 to the central opening 44, as shown in FIG. 5A. The first bracket 62 may define a channel 80 extending from the bottom 70 to the top 68. That is, the channel 80 may extend from the blower chamber 30 to the sensor chamber 26. The blower 32 may be in fluid communication with the sensor 24 via the channel 80. In other words, the blower 32 may exhaust air through the outlet 60 of the blower box 28 to the channel 80, and the channel 80 may direct the air into the sensor chamber 26.

Figure 5B:
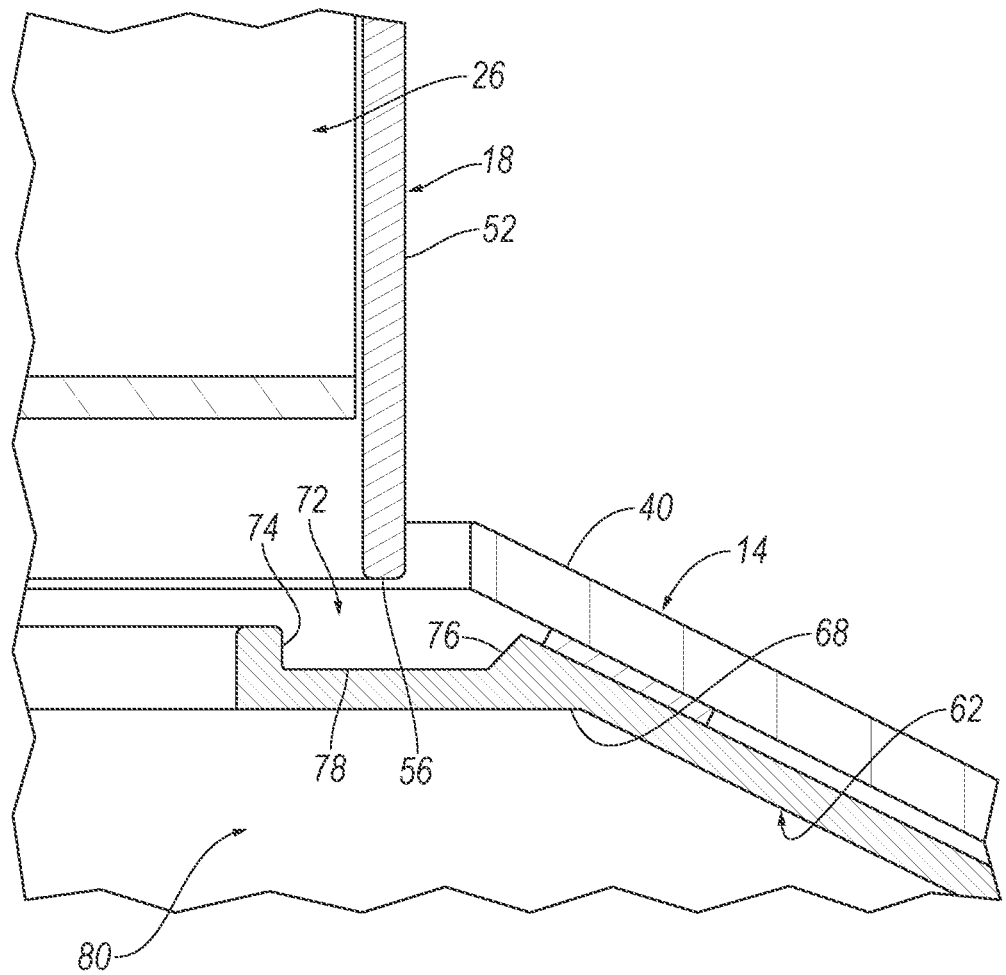
FIG. 5B is a magnified view of the portion circled in FIG. 5A.

With reference to FIG. 5B, the first bracket 62 may include a first gutter 72 disposed at the top 68. The first gutter 72 may extend from the one side 64 to the other side 66 of the first bracket 62. For example, the first gutter 72 may have a semi-circular shape centered on the axis A. The first gutter 72 is positioned directly below the bottom edge 56 relative to the axis A.

The first gutter 72 may include an inner wall 74 and an outer wall 76 spaced from the inner wall 74. The inner wall 74 may be disposed radially inward from the sensor housing 22 relative to the axis A, and the outer wall 76 may be disposed radially outward from the sensor housing 22 relative to the axis A. That is, the sensor housing 22 may be disposed radially between the inner wall 74 and the outer wall 76. The outer wall 76 may abut the housing upper piece 40.

The first gutter 72 includes a floor 78 extending from the inner wall 74 to the outer wall 76. The sensor housing 22 may be spaced from the floor 78 along the axis A. The position of the first gutter 72 below the sensor housing 22 provides a pathway for, e.g., rain or washer fluid, to drain away from the sensor assembly 12 without entering the housing 14. For example, the first gutter 72 can direct fluid towards the drain holes 46 on the housing upper piece 40. For example, the drain holes 46 may extend into the first gutter 72.

Figure 6:
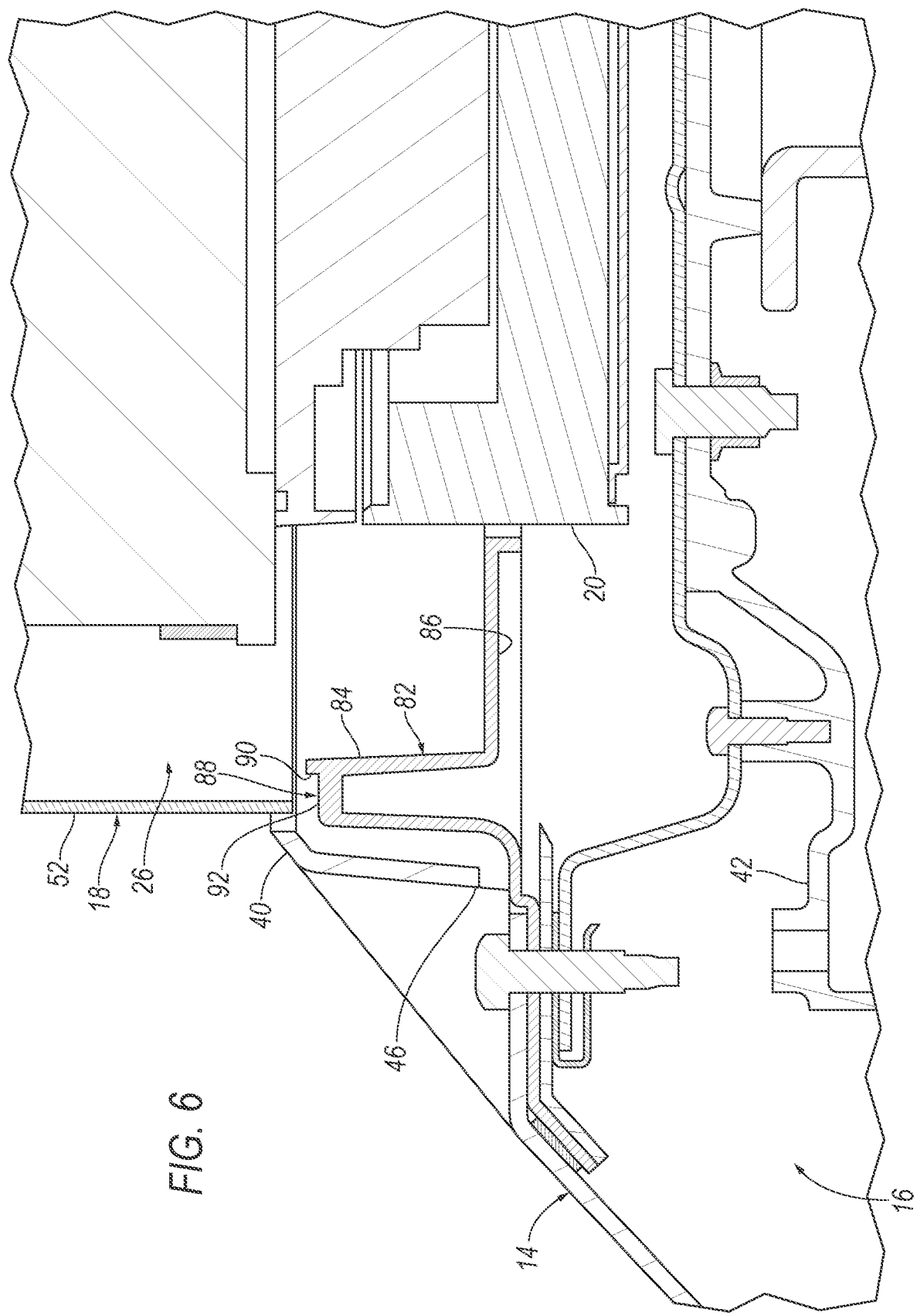
FIG. 6 is a cross-sectional view of another portion of the sensor assembly.

With reference to FIG. 6, the sensor assembly 12 may include a second bracket 82. The second bracket 82 may be connected to the first bracket 62. The second bracket 82 may extend partially circumferentially about the axis A from one side 64 of the first bracket 62 to the other side 66 of the first bracket 62, as shown in FIG. 2. That is, the first and second brackets 62, 82 may be non-unitary, i.e., formed separately and subsequently assembled to each other. As another example, the second bracket 82 may be monolithic with the first bracket 62.

The second bracket 82 includes an upper portion 84 and a lower portion 86 spaced from each other along the axis A. The upper portion 84 and the lower portion 86 may extend from one side 64 of the first bracket 62 to the other side 66 of the first bracket 62. The second bracket 82 may be supported by the housing lower piece 42. For example, the second bracket 82 may be mounted to the housing lower piece 42, e.g., in substantially the same manner as discussed above regarding the blower box 28.

With continued reference to FIG. 6, the lower portion 86 may extend radially inward of the upper portion 84 relative to the axis A. The lower portion 86 may be connected to the housing lower piece 42. The lower portion 86 of the second bracket 82 may abut the base 20 from one side 64 of the first bracket 62 to the other side 66 of the first bracket 62. That is, the lower portion 86 of the second bracket 82 may extend radially outward from the base 20 relative to the axis A. The lower portion 86 may be sealed to the base 20 from one side 64 to the other side 66. The first and second brackets 62, 82 may collectively extend entirely around the base 20 of the sensor 24.

The upper portion 84 of the second bracket 82 may be disposed adjacent to the sensor housing 22. Specifically, the upper portion 84 of the second bracket 82 may be aligned with the top 68 of the first bracket 62 relative to the axis A. The second bracket 82 may include a second gutter 88 disposed at the upper portion 84. The second gutter 88 is aligned with the first gutter 72 relative to the axis A. In other words, the second gutter 88 is positioned directly below the sensor housing 22 relative to the axis A. The second gutter 88 may extend from the one side 64 to the other side 66 of the first bracket 62. For example, the second gutter 88 may have a semi-circular shape centered on the axis A. The first and second gutters 72, 88 may collectively extend entirely circumferentially about the axis A.

The second gutter 88 includes an inner side 90 disposed radially inward from the sensor housing 22 relative to the axis A. The second gutter 88 includes a bottom side 92 extending radially outward from the inner side 90. The sensor housing 22 may be spaced from the bottom side 92 along the axis A. The position of the second gutter 88 below the sensor housing 22 provides a pathway for, e.g., rain or washer fluid, to drain away from the sensor assembly 12 without entering the housing 14. For example, the second gutter 88 can direct fluid towards the drain holes 46 on the housing upper piece 40. For example, the drain holes 46 may extend into the second gutter 88.

Returning to FIG. 3, the second bracket 82 may support a fluid nozzle 94. The fluid nozzle 94 may be aimed to direct fluid across the sensor 24. That is, the fluid nozzle 94 may direct fluid in a radially inward direction with respective to the axis A, i.e., in a direction that is toward the axis A. The fluid nozzle 94 may maintain clarity of a field-of-view of the sensor 24, e.g., liquid exiting the fluid nozzle 94 may clean the sensor 24. The second bracket 82 may support any suitable number of fluid nozzles 94.

Figure 7:
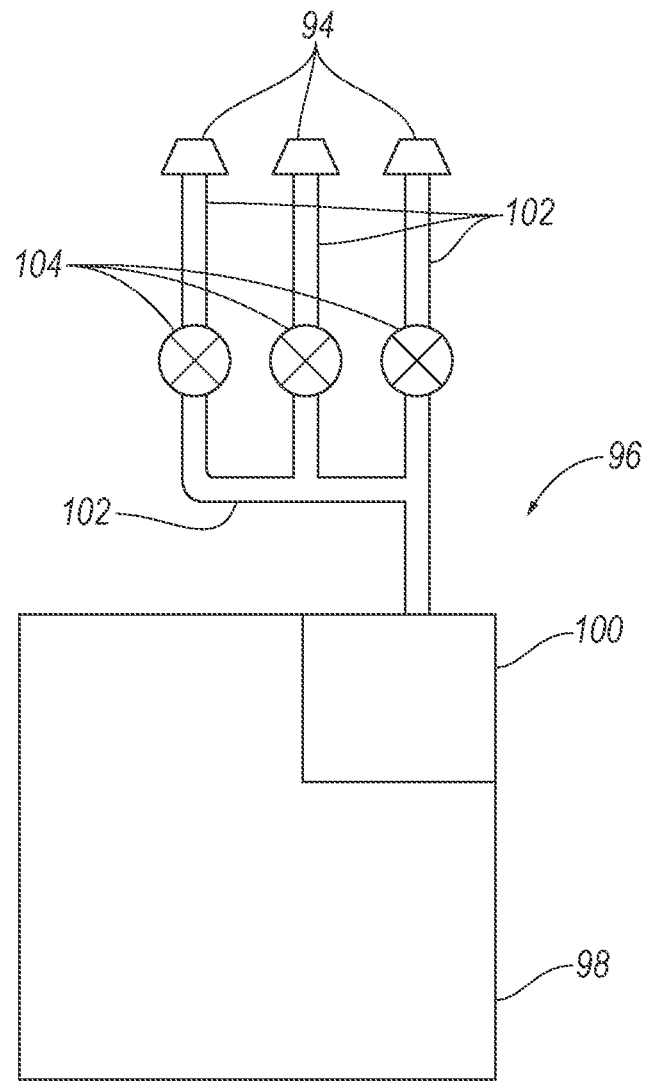
FIG. 7 is a diagram of an example cleaning system of the vehicle.

Turning now to FIG. 7, the vehicle 10 may include a liquid cleaning system 96. The liquid cleaning system 96 may include a reservoir 98, a pump 100, supply lines 102, valves 104, and the fluid nozzles 94. The reservoir 98 and the pump 100 are fluidly connected (i.e., fluid can flow from one to the other) to each valve 104 and to each fluid nozzle 94. The liquid cleaning system 96 distributes washer fluid stored in the reservoir 98 to the fluid nozzles 94. "Washer fluid" refers to any liquid stored in the reservoir 98 for cleaning. The washer fluid may include solvents, detergents, diluents such as water, etc.

The reservoir 98 may be a tank fillable with liquid, e.g., washer fluid for window cleaning. The reservoir 98 may be disposed in a front of the vehicle 10, specifically, in an engine compartment forward of a passenger cabin. Alternatively, the reservoir 98 may be disposed in the housing 14, e.g., in the chamber 16. The reservoir 98 may store the washer fluid only for supplying the sensor assembly 12 or also for other purposes, such as supply to the windshield.

The pump 100 forces the washer fluid through the supply lines 102 to the valves 104 and then to the fluid nozzles 94 with sufficient pressure that the washer fluid sprays from the fluid nozzles 94. The pump 100 is fluidly connected to the reservoir 98. The pump 100 may, for example, be attached to or disposed in the reservoir 98.

The supply lines 102 can extend from the pump 100 to the valves 104, and from the valves 104 to the fluid nozzles 94.

A separate supply line 102 extends from each valve 104 to the respective fluid nozzle 94. The supply lines 102 may be, e.g., flexible tubes.

The valves 104 are independently actuatable to open and close, to permit the washer fluid to flow through or to block the washer fluid; i.e., each valve 104 can be opened or closed without changing the status of the other valves 104. Each valve 104 is positioned to permit or block flow from the reservoir 98 to a respective one of the fluid nozzles 94. The valves 104 may be any suitable type of valve, e.g., ball valve, butterfly valve, choke valve, gate valve, globe valve, etc.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor assembly, comprising:
   a housing defining a chamber;
   a sensor unit supported by the housing and extending vertically upward along an axis from the housing, the sensor unit including a base and a sensor housing mounted to the base and rotatable relative to the base about the axis;
   the sensor unit including a sensor, the sensor housing extending circumferentially around the sensor and defining a sensor chamber therebetween;
   a blower box supported by the housing in the chamber, the blower box defining a blower chamber in fluid communication with the sensor chamber;
   a blower disposed in the blower box; and
   a bracket supported by the blower box in the chamber and extending partially circumferentially about the axis, wherein the bracket includes a top and a bottom spaced from each other along the axis, the bottom being sealed to the blower box and the top being adjacent the sensor housing.

2. The sensor assembly of claim 1, wherein the bottom of the bracket is sealed to the base.

3. The sensor assembly of claim 1, wherein the bracket includes a first gutter at the top, the first gutter including an inner wall disposed radially inward from the sensor housing and an outer wall disposed radially outward from the sensor housing.

4. The sensor assembly of claim 3, wherein the first gutter includes a floor extending from the inner wall to the outer wall, the sensor housing being spaced from the floor of the first gutter along the axis.

5. The sensor assembly of claim 1, wherein the bracket defines a channel extending from the blower chamber to the sensor chamber, the blower being in fluid communication with the sensor via the channel.

6. The sensor assembly of claim 1, wherein the bracket is a first bracket, the sensor assembly further comprising a second bracket supported by the housing in the chamber and extending partially circumferentially about the axis from the first bracket to the first bracket, wherein the second bracket includes an upper portion and a lower portion spaced from each other along the axis, the lower portion being connected to the housing and the upper portion being adjacent the sensor housing.

7. The sensor assembly of claim 6, wherein the lower portion of the second bracket is sealed to the base.

8. The sensor assembly of claim 6, wherein the second bracket includes a second gutter at the upper portion, the second gutter including an inner side disposed radially inward from the sensor housing.

9. The sensor assembly of claim 8, wherein the second gutter includes a bottom side extending radially outward from the inner side, the sensor housing being spaced from the bottom side of the second gutter along the axis.

10. The sensor assembly of claim 6, further comprising a fluid nozzle supported by the second bracket, the fluid nozzle being aimed to direct fluid across the sensor.

11. The sensor assembly of claim 1, further comprising a motor arranged to rotate the sensor housing relative to the base.

12. The sensor assembly of claim 1, wherein the blower box includes an inlet extending circumferentially about a blower axis, the blower being in fluid communication with the chamber via the inlet.

13. The sensor assembly of claim 12, wherein the blower includes an intake concentric with the inlet relative to the blower axis.

14. The sensor assembly of claim 12, wherein the blower is sealed to the blower box entirely around the inlet.

15. The sensor assembly of claim 1, wherein the housing includes a housing upper piece having a plurality of drain holes spaced from each other circumferentially about the axis.

16. The sensor assembly of claim 1, wherein the blower box includes an outlet in fluid communication with the sensor chamber and a drain spaced from the outlet.

17. The sensor assembly of claim 16, wherein the blower box is sealed except for the outlet and the drain.

18. The sensor assembly of claim 1, wherein the blower is fixed to the blower box.

19. The sensor assembly of claim 18, wherein the housing includes a housing upper piece and a housing lower piece, the blower being spaced from the housing upper piece and the housing lower piece in the chamber.

* * * * *